US006419079B1

(12) United States Patent
Diehr

(10) Patent No.: US 6,419,079 B1
(45) Date of Patent: Jul. 16, 2002

(54) MACHINE FOR GLUING FOLDING CARTONS FOR PRODUCING CARTONS FROM BLANKS

(75) Inventor: Wolfgang Diehr, Grevenbroich (DE)

(73) Assignee: Jagenberg Diana GmbH, Neuss (DE)

( * ) Notice: Subject to any disclaimer, the term of this patent is extended or adjusted under 35 U.S.C. 154(b) by 0 days.

(21) Appl. No.: 09/463,649

(22) PCT Filed: Jun. 1, 1999

(86) PCT No.: PCT/EP99/03784

§ 371 (c)(1), (2), (4) Date: Jan. 24, 2000

(87) PCT Pub. No.: WO99/62700

PCT Pub. Date: Dec. 9, 1999

(30) Foreign Application Priority Data

Jun. 4, 1998 (DE) ........................................ 198 24 982
Jun. 27, 1998 (DE) ........................................ 198 28 819

(51) Int. Cl.[7] ............................ B65G 15/12; B31B 3/58
(52) U.S. Cl. ............................... 198/626.1; 198/861.1; 198/586; 493/179; 493/177; 493/178
(58) Field of Search ................................ 156/578, 198, 156/207, 224, 226, 227; 118/324; 198/861.1, 626.1, 586; 493/178, 177, 179

(56) References Cited

U.S. PATENT DOCUMENTS 2,598,809 A * 6/1952 Liebl .......................... 493/177
3,666,261 A * 5/1972 Helm .......................... 271/45
4,551,124 A * 11/1985 Mowry ........................ 493/128
5,827,162 A * 10/1998 Rubin et al. ................ 493/178

FOREIGN PATENT DOCUMENTS

WO WO 97/14634 4/1997

* cited by examiner

*Primary Examiner*—Richard Crispino
*Assistant Examiner*—Yewebdar T Tadesse
(74) *Attorney, Agent, or Firm*—Herbert Dubno

(57) ABSTRACT

A gluing machine has, for transporting the blanks therethrough a roller belt mounted upon a roller cheek and an upper belt mounted upon a roller rail, both the roller cheek and roller rail being shiftable transversely to the direction in which the blanks are conveyed through the machine. The roller cheek is coupled to the roller rail by an endless cable or belt which has a lower loop extending transversely below the roller cheek and an upper loop above the roller rail. The roller cheek is rigidly connected to one strand of the lower loop while one strand of the upper loop is clamped to the roller rail.

7 Claims, 2 Drawing Sheets

MACHINE FOR GLUING FOLDING CARTONS FOR PRODUCING CARTONS FROM BLANKS

CROSS REFERENCE TO RELATED APPLICATION

This application is a national stage of PCT/EP99/03784 filed Jun. 1, 1998 based on German National applications 198 24 982.9 filed Jun. 4, 1998 and 198 28 819.0 of Jun. 27, 1998.

FIELD OF THE INVENTION

The invention relates to a collapsible-boxes gluing machine for producing collapsible boxes from blanks, with a device for transporting the blanks through the machine, whereby the device comprises lower conveyor belts supported on a roller cheek transversely movable by means of a drive and upper conveyor belts, which are also supported on a roller rail which is mounted so as to be transversely movable.

STATE OF THE ART

As is known, collapsible-box gluing machines can produce collapsible boxes from blanks in several processing stations, which are successively traversed by the blanks/boxes.

First the blanks are picked up one after the other from a stack in a high-speed feeder and fed individually directly to a folding station or, initially, to a so-called preliminary crusher, which precedes the folding station. In the folding station the blank parts provided with a glue strip are turned over by 180°, i.e. folded, for the purpose of producing an adhesive connection. In the preliminary crusher the folding flaps are folded back and forth prior to the application of the adhesive, so that the corresponding longitudinal groove lines are softened and made more pliant.

The folding station is normally followed by a so-called transfer station, where the boxes can be counted, marked and—if defective—thrown out. Then follows a collection and compression device, wherein at first a stream of folded overlapping blanks is formed, which subsequently is kept under pressure for a while between compression belts, so that the two blank parts are connected at the gluing seam. The final stage is usually a packaging device, where the flat, folded collapsible boxes are packaged in cartons.

The transport of the blanks through the individual processing stations takes place by means of upper and lower conveyor belts, each supported on their sides facing away from the blanks, As a rule over the machine width two pairs of narrow belts are used, which for the adjustment to various box formats, can be shifted transversely for the optimal contact line with the blanks. As is known, the upper conveyor belts can be lifted with their mounting, so that when the machine jams, the boxes can be removed.

It is known to divide the conveyor path into individual segments. Each of the lower transport belts of a segment is supported in a so-called roller cheek which extends over the desired conveyor path, and comprises at its upper side over its length a row of narrow rollers, which support the upper strand of the conveyor belt on its underside. Each upper conveyor belt of a segment is supported on a so-called roller rail, which also extends in transport direction over the desired conveyor path and has at its underside a row of rollers, which support the upper side of the lower belt strand. Roller cheeks and roller rails can each be positioned transversely, so that they are arranged directly one above the other in the desired work position, in order to hold and transport the blanks between the conveying belt strands. At least the conveyor belts of the roller cheeks arranged at the bottom are driven. The conveyor belts of the pertaining top roller rails are either idlers or—for instance when processing thick blanks or corrugated cardboard—are also driven in order to avoid marking of the blanks.

In the known collapsible-box gluing machines, the parts on which the upper roller rails are fastened are of a complicated construction, so that they can be synchronously transversely positioned with the pertaining roller cheek and lifted at the same time.

OBJECT OF THE INVENTION

It is therefore the object of the invention to simplify the construction of a generic collapsible-boxes gluing machine. This object is achieved in a collapsible-boxes gluing machine for producing collapsible boxes from blanks with a device for the transport of the blanks through the machine, comprising:

- lower conveyor belts, which are supported on a roller cheek
- transversely displaceable by means of a drive; and
- upper conveyor belts which are supported on a transversely displaceable roller rail. An endless cable or belt-like element, preferably a wire cable, is arranged in the machine in double strands freely movable in its longitudinal direction, so that
  - a loop runs below the conveying plane of the blanks across the machine width and
  - a second loop runs parallel to the first loop above the conveying plane across the machine width. The roller cheek is rigidly connected with a strand of the lower loop and the roller rail can be securely clamped to the other strand of the upper loop, so that the roller rail is entrained during a transverse displacement of the roller cheek.

In preferred, particularly advantageous embodiments of the invention, the upper loop runs above the roller rail.

On each side of the machine there are stands, a support beam being supported between the stands at a distance above the conveying plane, whereby the roller rail is fastened to the lower end of the support part, which at its upper end is designed as a travelling carriage suspended from the support beam. The upper loop of the belt or cable-like element runs above the support beam. The support beam is supported so as to be vertically movable on the stands.

BRIEF DESCRIPTION OF THE DRAWING

The drawing serves for the clarification of the invention with reference to a simplified representation of an embodiment in the drawing.

SPECIFIC DESCRIPTION

Figure 1:
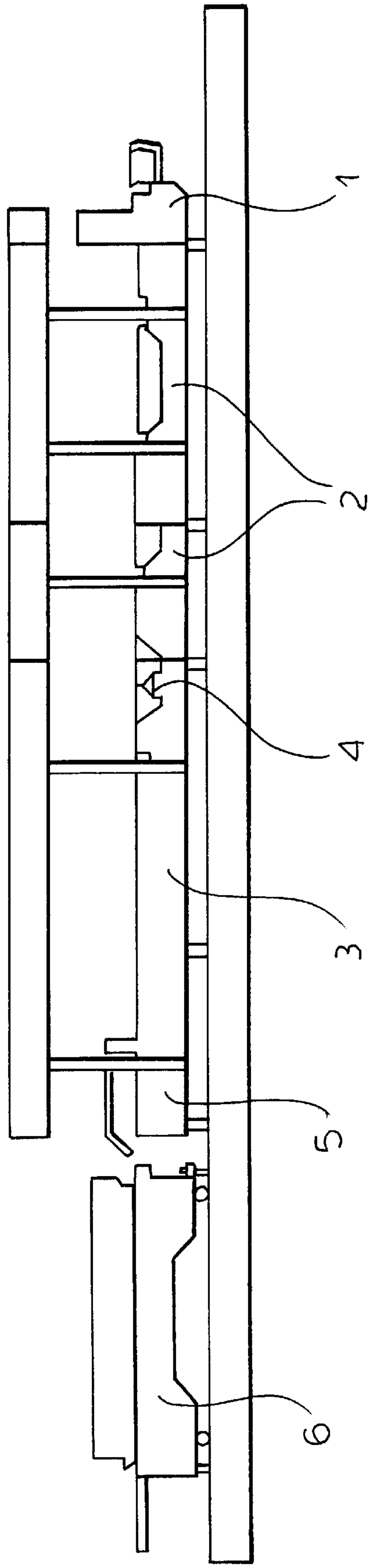
FIG. 1 shows a schematic side view of the individual stations of a collapsible-box gluing machine.

Seen in conveying direction (from right to left), the collapsible-box machine starts with a feeder 1, which picks up at high speed the blanks to be processed one after the other from a stack and feeds them separately to the subsequent processing station. The feeder 1 is followed by a preliminary crusher 2, which in the present embodiment example is designed in two stages. The preliminary crusher comprises folding elements, in order to fold folding flaps back and forth, so that the corresponding longitudinal groove lines are made soft and pliable by being bent at 180°. The two-stage design makes it possible to crush more longitudinal and transverse lines and to provide additional folds. In the case of certain box shapes, adhesive applicators are arranged already within the preliminary crusher, in order to apply additional adhesive strips in longitudinal direction. The next work station following the preliminary crusher 2 is the folding station 3, at whose initial part an adhesive applicator 4, normally for glue, is arranged. The adhesive applicator 4 comprises glue nozzles or glue plates which apply strips of glue to the blanks. Subsequently the folding flaps of the blanks are folded by folding elements.

The flat-lying folded boxes are subsequently fed to a transfer station 5 which transfers them to a subsequently arranged collection and compression station 6. During the transfer from the transfer station 5 to the collection and compression station 6 a stream of overlapping folded boxes is produced. The collection and compression station 6 has compression belts by means of which the gluing seams are kept under pressure, until the adhesive is securely bonded.

Figure 2:
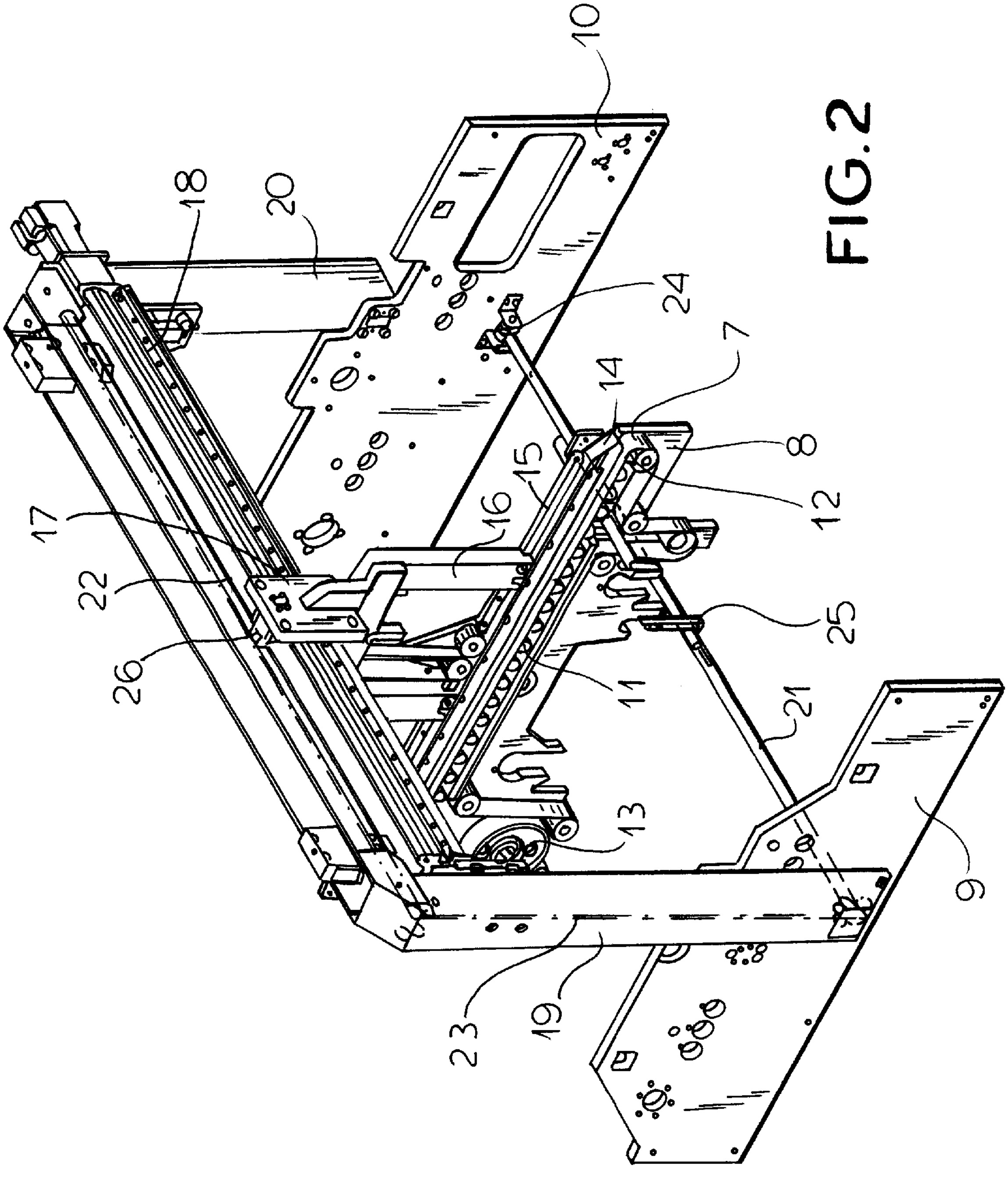
FIG. 2 shows a perspective view of the mounting and the adjustment mechanism of a conveyor belt pair.

During transport through the preliminary crusher 2 and the folding station 3, the flat-lying folded blanks are held between the upper and lower conveyor belts, whereby usually two belt pairs are arranged over the machine width, which are composed by separate segment in conveying direction. Each belt pair of a segment consisting of an upper and a lower conveyor belt must be supported transversely displaceable in the machine frame, in order to set the optimal attack position with respect to the changing blank formats. FIG. 2 shows in detail the construction of a belt pair and its support in the machine, including the means for transverse shifting.

The lower conveyor belt 7 is supported in a roller cheek 8 extending in conveying direction, which is suspended in a known manner in the machine frame and can be transversely positioned by means of resetting spindles. The adjustment spindles not shown in FIG. 2 are fastened with their end in the lateral walls 9, 10 of the gluing machine. They are connected with a rotary drive, which causes the transverse shifting of the roller cheek 8. At the upper edge of the roller cheek 8, a row of rollers 11 are fastened so as to be freely movable, the upper strand of the conveyor belt 7 being supported by them. The conveyor belt 7 is an endless, closed conveyor belt. It is guided at the beginning end of the roller cheek 8 by belt pulleys 12, 13 whereby, for the purpose of driving belt 7, the belt pulley 13 deflecting the belt on the outrunning side sits transversely displaceable on a driven shaft, e.g. a polyhedral shaft, which is also supported with its ends in the lateral walls 9, 10 of the machine frame. In this way the roller cheek 8 with the lower conveyor belt 7 can be transversely shifted between the lateral walls 9, 10, in order to assume the desired work position.

The upper conveyor belt 14 is supported on a so-called roller rail 15, which is fastened to the lower end of a fork-like support element 16. The lower strand of the conveyor belt 14 is also supported by rollers at its upper side. The upper conveyor belt 14 is either supported to revolve freely or is also driven, then in any case in the opposite sense with respect to the lower conveyor belt 7, so that the conveying strands of both belts 7, 14 move in the same direction.

The upper part of the support part 16 of the roller rail 15 is designed as a travelling carriage 17 which is suspended from a support beam 18. The support beam 18 extends over the machine width at a certain height above the conveying plane of the blanks. Each of its two ends is mounted so as to be vertically movable in a respective lateral stand 19, 20. The stands 19, 20 are securely bolted to the lateral walls 9, 10 of the machine. Due to this construction the travelling carriage 17 with the therefrom suspended roller rail 15 is suspended in the machine so that it can be freely displaced transversely. This takes place according to the invention with the following means of a very simple construction.

A closed, endless belt or cable-like element, preferably a wire cable, is stretched so as to be freely movable in longitudinal direction between the two lateral plates 9, 10 of the machine, so that a loop 21 of the cable runs across the machine width below the conveying plane of the blanks in the area of the roller cheek 8. The second loop 22 at the other end of the wire cable runs parallel to the first loop 21, above the conveying plane, preferably above the roller rail 15 in the area of the travelling carriage 17. Between the lower loop 21 and the upper loop 22 the two strands 23 of the wire cable are guided upwards in a lateral stand (stand 19). As can be seen in FIG. 2, the wire cable guided in a double strand starts at a guide roller 24, which is supported freely rotatable on the inside of a lateral wall (lateral wall 10). A first lower loop 21 runs then rectilinearly below the area of the roller cheek 8 towards the other lateral wall (lateral wall 9). There both strands 23 are guided vertically upwards and run inside the stand 19 upwards, until they reach the area above the support beam 18, at this level both strands 23 are guided into a horizontal run and run again horizontally towards the other machine side, forming the loop 22. There the end of the loop 22 is guided over guide rollers which are supported freely rotatable on the stand 20.

The wire cable 21, 22, 23 serves as a traction cable for the upper roller rail 15, in order to synchronously pull the same during a transverse displacement of the roller cheek 8. For this purpose the roller cheek 8 is connected with a strand of the lower loop 21 via a fish-plate shaped element 25, so that when the roller cheek 8 is displaced by means of the worm gear, this strand is entrained in the corresponding direction. The travelling carriage 17 of the roller rail 15 has a clamping device 26, by means of which it can be clamped to the other strand of the upper loop 22. In the clamped state the travelling carriage 17 moves synchronously with the thereto fastened roller cheek 8. During a transverse displacement of the roller cheek 8 it is entrained in the corresponding direction, without the need of its own drive.

Preferably the support beam 18 arranged below the upper loop 22 is supported vertically movable within limits in the stands 19, 20. The vertical mobility of the support beam 18 with the thereon suspended roller rail 15 makes possible to set a predetermined distance between the conveying strands of the two conveyor belts 7, 14. At the same time the roller rails 15 can be moved upwards in a maintenance position, wherein for instance jamming blanks can be removed. Preferably the vertical motion of the support beam 18 is performed by means of two pneumatic cylinders, each arranged in stands 19, 20, which press the support beam upwards against an adjustable stop. In this way the desired vertical position of the roller rails 15 can be set via the adjusting stops.

What is claimed is:

1. A blank transporter for conveying box blanks through a collapsible-box gluing machine, said blank transporter comprising:

a roller cheek extending parallel to a direction of displacement of said blanks, below said blanks and along a transport path of said blanks through a collapsible-box gluing machine;

a lower conveyor belt supported on said roller cheek for supporting said blanks;

a roller rail above said transport path, said roller cheek and said roller rail being displaceable transversely to said direction;

an upper conveyor belt above said path supported on said roller rail; and an endless element extending in a lower double-strand loop lying below said transport path, a double-strand loop lying above said transport path and an upper double strand connecting said loops at a side of said path, said double strands of said loops being freely movable in respective longitudinal directions, one strand of said lower loop being rigidly connected to said cheek and one strand of said upper loop being securely clamped to said roller rail so that the roller rail is entrained during a transverse displacement of said roller cheek.

2. The blank transporter defined in claim 1 wherein said endless element is a wire cable.

3. The blank transporter defined in claim 1 wherein said endless element is a belt.

4. The blank transporter defined in claim 1 wherein said upper loop runs above the roller rail.

5. The blank/transporter defined in claim 4 wherein a pair of strands are provided on opposite sides of said machine, a support beam is supported between said strands at a distance above said transport path, said roller rail being fastened to a support suspended from a carriage shiftable on said beam.

6. The blank/transporter defined in claim 4 wherein said upper loop runs above said support beam.

7. The blank/transporter defined in claim 5 wherein said support beam is supported so as to be vertically movable on said strands.

* * * * *